United States Patent
Sri-Jayantha et al.

(10) Patent No.: US 6,731,454 B2
(45) Date of Patent: May 4, 2004

(54) DISK DRIVE WITH A PIVOT EMBEDDED TORQUE GENERATING TRACK FOLLOW ACTUATOR AND METHOD THEREFOR

(75) Inventors: Sri M. Sri-Jayantha, Ossining, NY (US); Vijayeshwar D. Khanna, Millwood, NY (US); Fu-Ying Huang, San Jose, CA (US); Mitsuro Ohta, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 397 days.

(21) Appl. No.: 09/877,012

(22) Filed: Jun. 11, 2001

(65) Prior Publication Data

US 2002/0186498 A1 Dec. 12, 2002

(51) Int. Cl.[7] .............................................. G11B 5/596
(52) U.S. Cl. .................................................. 360/78.12
(58) Field of Search ........................ 360/78.12, 78.09, 360/77.01, 75, 77.02, 96.6

(56) References Cited

U.S. PATENT DOCUMENTS

| | | | |
|---|---|---|---|
| 5,267,110 A | | 11/1993 | Ottesen et al. |
| 5,291,355 A | * | 3/1994 | Hatch et al. ............. 360/97.01 |
| 5,432,663 A | | 7/1995 | Ichihara |
| 5,592,346 A | | 1/1997 | Sullivan |
| 5,822,281 A | * | 10/1998 | Yumita .................... 369/13.32 |
| 6,051,833 A | * | 4/2000 | Yasutake .................... 250/306 |
| 6,088,186 A | | 7/2000 | Carlson |
| 6,122,139 A | * | 9/2000 | Sri-Jayantha et al. .... 360/97.02 |
| 6,392,847 B1 | * | 5/2002 | Kabasawa et al. ....... 360/266.9 |
| 6,611,404 B1 | * | 8/2003 | Kabasawa ................. 360/266.9 |

FOREIGN PATENT DOCUMENTS

| | | |
|---|---|---|
| EP | 0 355 692 A2 | 2/1990 |
| JP | 62-231476 | 10/1987 |
| JP | 02-054480 | 2/1990 |

OTHER PUBLICATIONS

K. Aruga et al., "High–Speed Orthogonal Power Effect Actuator for Recording at Over 10,000 TPI", IEEE Transactions on Magnetics, vol. 32, No. 3, May 1996, pp. 1756–1761.

H. Yamura et al., "New H–Infinity Design for Track–Following", Digests of APMRC2000, ISBN 0–7803–6254–3, Nov. 2000, pp. TA4–01 and TA4–02.

J. Heath, "Boosting Servo Bandwidth", Digests of APMRC2000, ISBN 0–7803–6254–3, Nov. 2000, pp. MP20–01 and MP20–02.

Fu–Ying Huang et al., "Active Damping in HDD Actuator", Digests of APMRC2000, ISBN 0–7803–6254–3, Nov. 2000, pp. MB6–01 and MB6–02.

* cited by examiner

Primary Examiner—David Hudspeth
Assistant Examiner—Fred F. Tzeng
(74) Attorney, Agent, or Firm—Thomas R. Berthold; Sean M. McGinn (57) ABSTRACT

A disk drive system (and method) includes an actuator system including a first voice coil motor (VCM), a second voice coil motor for enhancing dynamic resonance properties of the actuator system, and a single error position detecting mechanism, thereby enabling a higher bandwidth servo system configured with a single position error detection source.

9 Claims, 13 Drawing Sheets

DISK DRIVE WITH A PIVOT EMBEDDED TORQUE GENERATING TRACK FOLLOW ACTUATOR AND METHOD THEREFOR

BACKGROUND OF THE INVENTION

1. Field of the Invention

The present invention generally relates to a disk drive, and more particularly to a disk drive having a pivot embedded torque generating track follow actuator.

2. Description of the Related Art

Growth in areal density (bits/sq. inch) of a hard disk drive (HDD) is achieved through an increase in track density and bit density metrics. Technical advancement in electromechanical components and servo system architecture facilitates the increase in track density. Indirectly, an increase in track density requires a commensurate increase in crossover frequency of the track following servo transfer function. A 3.5" HDD for server class applications reached a track density of 30 kTPI (tracks per inch) in year 2000, and the growth is expected to continue into the next decade.

Actuator resonance modes have become fundamental limiters in achieving higher servo crossover frequency required for high TPI design.

The sector servo system of a 3.5" server class HDD with a 1 kHz openloop crossover frequency has been able to meet 30 kTPI (tracks per inch) track-following accuracy requirements. However, the growth of track density to higher than 30 kTPI has emerged as a major challenge to the actuator and servo system design.

Further, mechanical system resonance is a key limiter to higher bandwidth control. Use of microelectromechanical (MEMs) devices has been studied to increase actuator response characteristics. A major innovation in the actuator system design to increase the servo crossover frequency is desirable, but the storage industry needs cost-effective innovations in servo system design. A drastic change in the actuator system design does not retain the time-proven simple actuator system concepts. Thus, an alternative servomechanics approach is required to meet the high track density challenges. However, prior to the present invention, such an alternative, optimized approach has not been presented or developed.

Figure 1A:
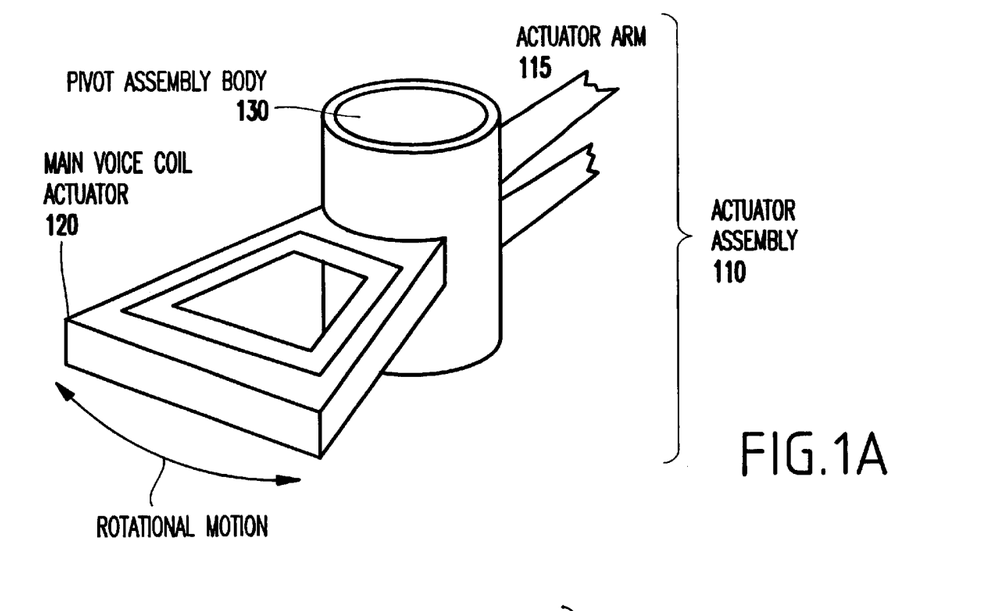
FIG. 1A illustrates a conventional disk actuator assembly 110 and FIG. 1B illustrates a pivot bearing assembly.
Figure 1B:
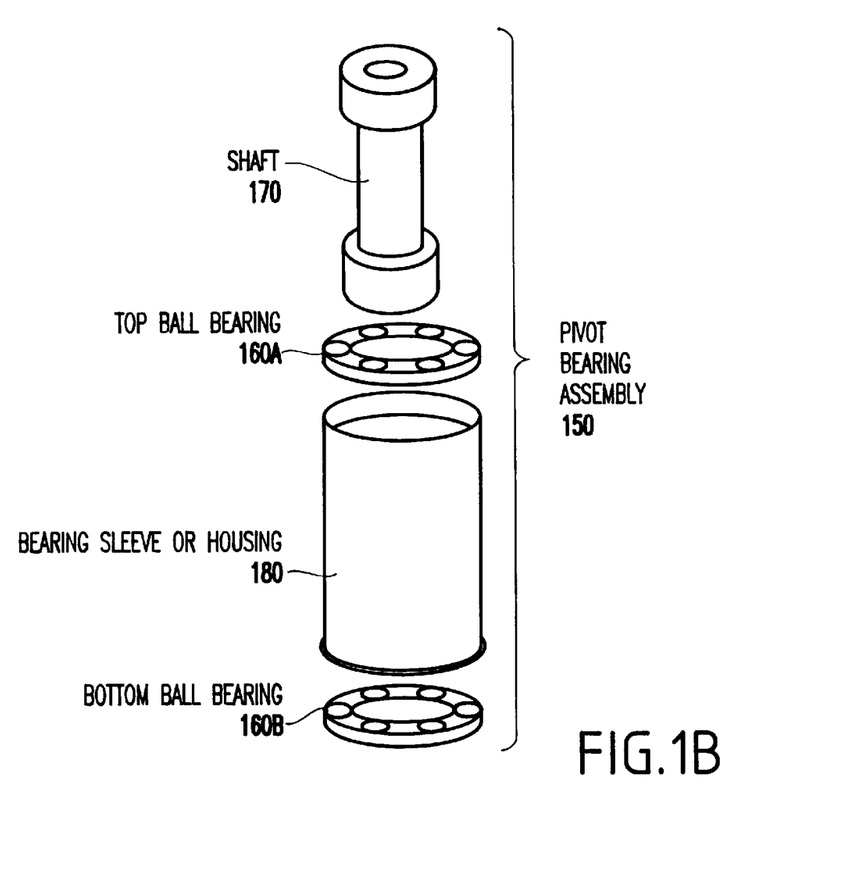

For example, turning to FIGS. 1A–1B, a conventional rotary actuator assembly 110 of a disk drive has a single voice coil motor (VCM) 120. It produces a force about a pivoting point in order to generate a change in radial position of the read/write head.

FIG. 1A shows the conventional rotary actuator assembly 110 found in a HDD. The actuator (and actuator arm 115) is made to pivot (e.g., by a pivot bearing assembly 150) about an axis when the VCM 120 is activated. As shown the actuator assembly 110 further includes a pivot assembly body 130.

The pivot itself is composed of a pair of ball bearings 160A, 160B, as shown in FIG. 1B, which are assembled with an appropriate preload so that the pivoting function is made to be sufficiently free of rotational stiffness. The ball bearings 160A, 160B, along with an inner shaft 170, are fitted inside of a bearing sleeve or housing 180, with the pivot assembly body 130 being fitted over the pivot bearing assembly 150. Thus, the shaft and ball bearings support the entire actuator assembly 110. The linear radial stiffness of the bearings 160A, 160B is high enough to maintain the resonance of a rigid actuator to be around 10 kHz. In a "real world" application, the radial stiffness of the pivot-bearing contributes to general reduction of the free-body vibration of the actuator assembly 110. Early recognition of pivot stiffness induced dynamics as a detractor and a solution to it can be found in commonly-assigned U.S. Pat. No. 5,267,110, incorporated herein by reference.

Recently several institutions have shown initiative in addressing the problem of finite radial stiffness (e.g., see K. Aruga, "High-speed orthogonal power effect actuator for recording at over 10,000 TPI, IEEE Transactions on Magnetics, Vol. 32, No. 3, May 1996).

Figure 2A:
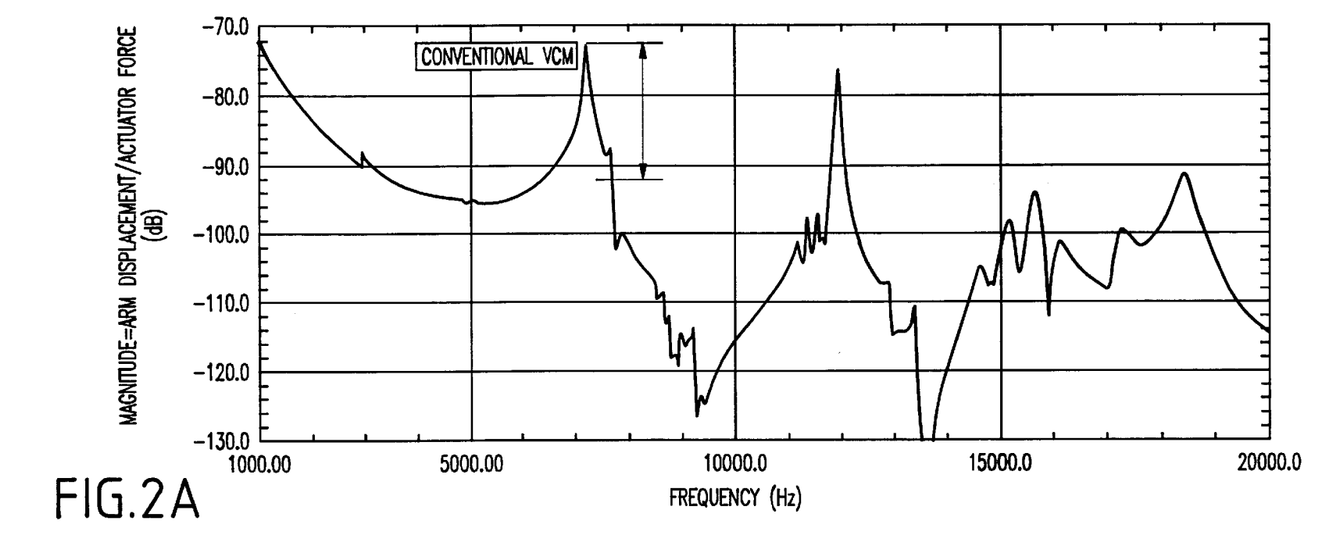
FIG. 2A illustrates the magnitude-frequency response of a typical open-loop transfer function with the actuator resonance modes and FIG. 2B illustrates the phase-frequency response of a typical open-loop transfer function with the actuator resonance modes.
Figure 2B:
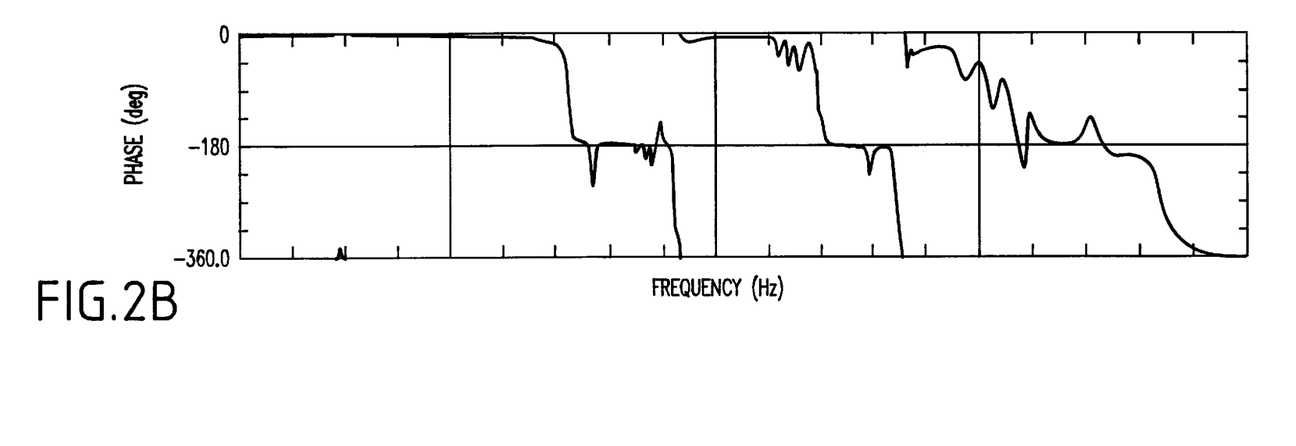

Turning now to FIGS. 2A–2B, there are several actuator resonance modes associated with a 3.5" form factor HDD.

FIG. 2A shows a graph of magnitude with respect to frequency. That is, when a force (current) is applied to the actuator, the head is anticipated to move in a certain way (e.g., a certain frequency will result in the conventional actuator arm assembly).

The first important mode (e.g., resonance peak) that occurs around 7 kHz is understood to arise from bending of the actuator voice coil motor around its pivoting point. The coil bending resonance (CBR) is associated with a 180-degree phase change (e.g., see FIG. 2B which shows the phase as a function of frequency) and in certain configurations the magnitude/phase combination could produce an unstable condition of the track-follow servo. This bending mode characteristic also is sensitive to temperature, pivot parameters and other design parameters of a disk drive.

Conventional approaches of managing the presence of this mode have been to introduce a digital notch filter in series with the servo controller during a seek and track-follow mode. A notch filter reduces the negative effect of the peak gain that occurs due to the coil bending resonance (CBR). Because of the temperature-induced drift of the resonance frequency as well as the manufacturing variability encountered within a population of a product, the digital notch filters are designed to have wider than required attenuation bandwidth, thereby resulting in a corresponding phase loss in the crossover region of the servo loop. The loss of phase in turn limits the achievable crossover frequency of the track-follow servo system.

Another industry effort to tackle the CBR has been to include an active damping servo loop within the conventional positioning servo (e.g., see F. Huang, T. Semba, W. Imaino and F. Lee, "Active Damping in HDD Actuator," Digests of APMRC2000," ISBN 0-7803-6254-3, November 2000, page MB6-01). This method, which is theoretically equivalent to that of an optimized digital notch filter, has been implemented in some server class HDDs.

A passive method to enhance the CBR resonance through structural modification is proposed in J. Heath, "Boosting servo bandwidth," Digests of APMRC2000," ISBN 0-7803-6254-3, November 2000, page MP20-01. Briefly, suppressing the CBR by various methods has a time limited advantage, and it does not allow for progressive growth in servo crossover frequency required for next generation HDDs.

Thus, the impact of coil resonance in the track-follow servo transfer function must be minimized, and hence requires new innovations. The present actuator system with a single VCM is primarily optimized for seek operation. The track-follow performance is extracted from the same actuator structure as a secondary challenge. However, this constraint must be removed in order to achieve not only an optimum access but also a high track density settle-out and track follow performance. H. Yamura and K. Ono, "New H-infinity design for track-following," Digests of APMRC2000," ISBN 0-7803-6254-3, November 2000, page TA4-01 proposes a configuration in which the contribution of CBR is circumvented by a second actuator.

Figure 3:
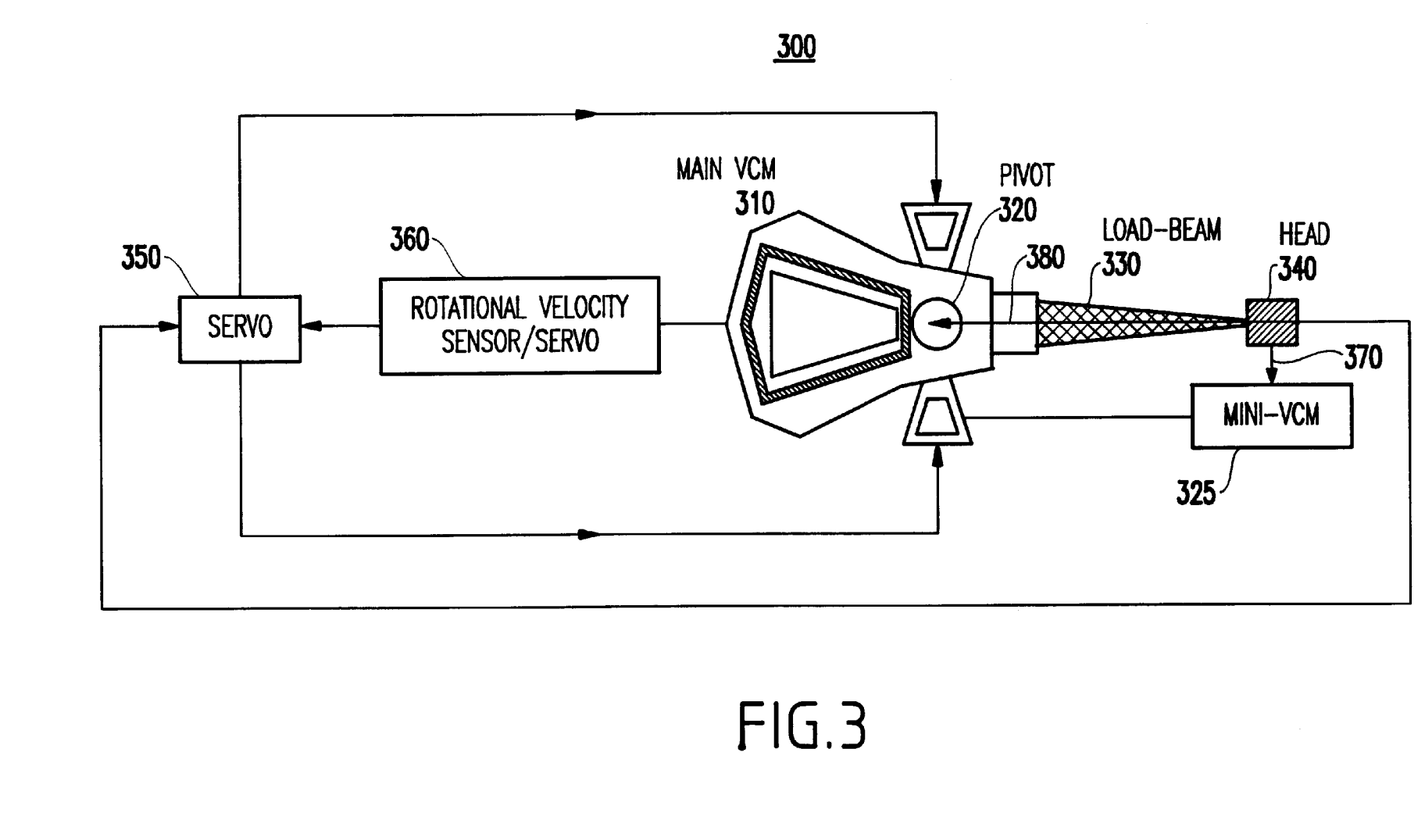
FIG. 3 illustrates a conventional torque generating actuator 300.

FIG. 3 shows a conventional disk torque generating actuator concept in which a generic torque producing VCM configuration for track-following operation is suggested (e.g., see the above-mentioned U.S. Pat. No. 5,267,110, incorporated herein by reference).

In FIG. 3, the torque generator 300 includes a main VCM 310, a pivot 320, a "mini-VCM" 325, a load-beam 330, and a head 340 which provides an input to a servo 350. The servo 350 also receives an input from a rotation velocity sensor/servo 360 coupled to the main VCM 310. The servo 350 provides outputs to the main VCM 310 and the mini-VCM 325 to move the head about the pivot.

It is noted that this system developed in that the previous conventional system employed only the main VCM. However, a problem arose in that, in applying a force to the arm (and thus the head) by the main VCM 310 (e.g., based on a signal from the servo), a clockwise torque should result, thereby moving the head in a clockwise direction.

However, because of the configuration of the previous conventional device, in applying the force (and moving the head) to create a clockwise torque, a force was also being produced along the pivot normal axis 370 of the actuator (e.g., upward). The normal axis 370 is orthogonal to the actuator long axis 380, as shown in FIG. 3. Due to the compliance of the pivot 320, a linear motion was also being produced in the normal axis 370 direction of the entire system, thereby moving the head in a direction opposite to where the head was desired to move (e.g., clockwise). Thus, the mini-VCM 325 was developed and provided to apply an opposite force to ensure the head was compensated for and moved in the desired clockwise direction.

However, with the provision of the mini-VCM 325 and trying to avoid the problems occurring with the compliance of the pivot, space problems have arose in the tight design space of the disk drive especially with disk drive platters provided over the actuator arms close to the pivot. Thus, these problems have made provision of a second coil unattractive in the conventional design.

Thus, the conventional systems have failed to produce an actuator structure that is capable of enhancing the track-follow performance without being constrained by the seek actuator design. However, realization of this concept in a product having disk platters (e.g., a tight, small-space environment) and other components sensitive to an electromagnetic field requires significant innovation.

Prior to the present invention, neither the advantages of such a concept have been recognized, let alone a practical development of such a concept even been undertaken. Indeed, there has been no system which has optimized the move/seek time for large displacements, compensated for the resonance features which appear as a result of the bearding/pivot compliance as well as the bending of the entire main-VCM structure (e.g., a relatively large structure), and yet simultaneously provided a compact system.

SUMMARY OF THE INVENTION

In view of the foregoing and other problems, drawbacks, and disadvantages of the conventional methods and structures, an object of the present invention is to provide an actuator structure (and method) which is capable of enhancing the track-follow performance without being constrained by the seek actuator design.

Another object is to realize such a concept in a product having disk platters and other components sensitive to an electromagnetic field.

Another object is to provide a method and system which provides compensation for a relatively low frequency resonance (e.g., having a peak around 7 kHz, as shown in FIGS. 2A–2B) and which, at the same time, optimizes the move/seek time for large displacements.

In a first aspect of the present invention, a disk drive system, includes an actuator system including a first voice coil motor (VCM), a second voice coil motor for enhancing dynamic resonance properties of the actuator system, and a single position error detecting mechanism commonly provided for the first and second voice coil motors.

In a second aspect, an actuator assembly for a disk drive system having a main voice coil motor (VCM), includes an actuator distributed to generate torque for track-following in addition to the main voice coil motor.

In a third aspect, a computer system, includes a disk drive system, and an actuator assembly for the disk drive system having a main voice coil motor (VCM), and an actuator distributed to generate torque for track-following in addition to the main voice coil motor.

In a fourth aspect, a pivot assembly for a disk drive system having a main voice coil motor (VCM), includes a pivot member, and an actuator embedded in the pivot member to generate torque for track-following in addition to the main voice coil motor.

In a fifth aspect, a spindle assembly for a disk drive system having a main voice coil motor (VCM), includes a spindle, and an actuator embedded in the spindle to generate torque for track-following in addition to the main voice coil motor.

In a sixth aspect of the present invention, a servo system assembly for a disk drive system, includes a first actuator, and a second actuator having a smaller form factor than the first actuator to generate torque for track-following in addition to the first actuator.

In a seventh aspect, a computer memory system, includes a disk drive system, and a servo system assembly for the disk drive system, the servo system including a first actuator, and a second actuator having a smaller form factor than the first actuator to generate torque for track-following in addition to the first actuator.

In an eighth aspect of the present invention, a server system, includes an actuator system including a first voice coil motor (VCM), and a second voice coil motor for enhancing dynamic resonance properties of the actuator system.

In a ninth aspect of the present invention, a method of generating torque for track following in a disk drive, includes providing an actuator system including a first voice coil motor (VCM), and distributing a second VCM in the actuator system for enhancing dynamic resonance properties of the actuator system and for generating torque for track-following in addition to the first VCM.

With the unique and unobvious aspects of the present invention, a system and method are provided in which an actuator structure enhances the track-follow performance without being constrained by the seek actuator design.

In this regard, the invention compensates for (e.g., negates) the effect of the low frequency resonance and simultaneously provides a practical drop-in solution (e.g., a retrofit onto existing systems with minimal disruption and redesign of the existing systems). That is, in situations where the conventional actuator is not enough to provide the required bandwidth (e.g., as track densities are increasing), the inventive actuator system can be "dropped in" in place of the conventional actuator, without demanding major changes in the way the rest of the drive components are developed.

Hence, of the options available, the conventional system operators need not "gold plate" (e.g., fine-tune) the existing design of the systems, nor do they need to jump to an entirely new technology (e.g,. usage of MEMs, dual actuators, etc.). Instead, the system operators can use the invention as a "drop-in" solution, thereby providing an integrated, proven system having great cost savings and minimal risk.

Additionally, all of the experiences of vendors of spindle motor design can be easily leveraged into making the pivot VCM.

BRIEF DESCRIPTION OF THE DRAWINGS

The foregoing and other purposes, aspects and advantages will be better understood from the following detailed description of preferred embodiments of the invention with reference to the drawings, in which.

DETAILED DESCRIPTION OF PREFERRED EMBODIMENTS OF THE INVENTION

Referring now to the drawings, and more particularly to FIGS. 4–13B, there are shown preferred embodiments of the method and structures according to the present invention. It is noted that for consistency and clarity the same reference numerals will be used through the application and drawings to designate the same structures.

Generally, the invention provides a configuration for a disk drive position mechanism having multiple force generating actuators. The actuators are optimally located to achieve both seek and settle out/track follow performance using a single position error source with a sector servo architecture.

The invention belongs to a category of dynamic systems in which a Single Output (position error) is controlled by Multiple Inputs (MISO). A practical realization of the configuration is made feasible by embedding the track-follow actuator system into the pivot assembly. This design innovation modularizes the development process of a disk drive by decoupling the seek actuator/arm design from the pivot assembly design. Experience and expertise accrued from the design of compact spindle motor design methods is deployed to achieve an effective pivot-VCM for high bandwidth track-following servo configuration. Variations in the design is made possible by allowing either the coil or the magnet to be moveable. The track-following dynamic torque is shown to modify the magnitude and phase properties of the transfer function in a constructive direction so that a higher band width servo system is made possible.

Preferred Embodiment

Figure 4:
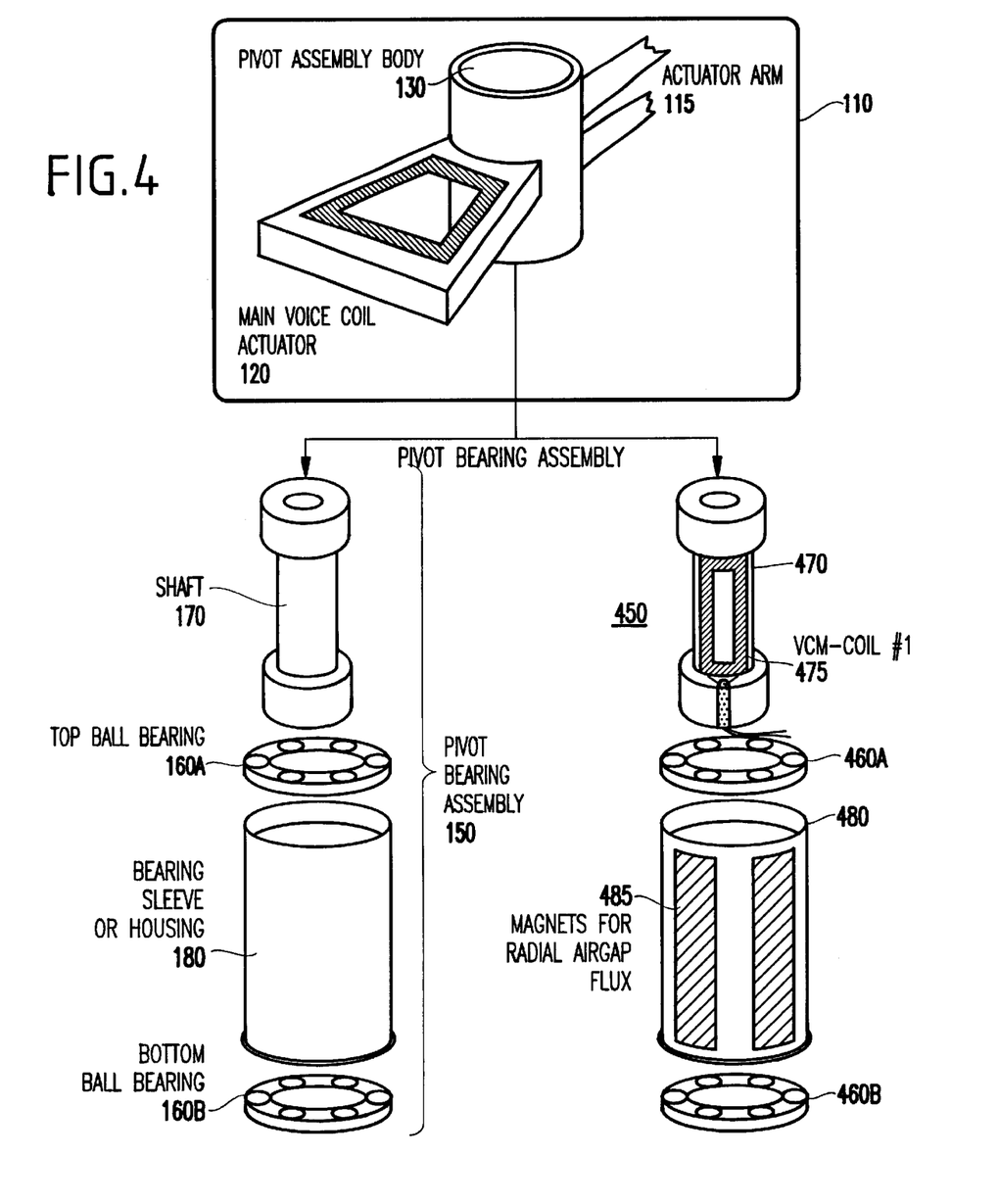
FIG. 4 illustrates a pivot modified to generate torque using a pivot-Voice Coil Motor (VCM) 450 according to the present invention in comparison to the conventional pivot bearing assembly 150 of FIG. 1B.

Turning now to FIG. 4, a preferred configuration is shown of the present invention in which the pivot element 150 of the conventional actuator (e.g., as shown in FIG. 1) is modified to achieve a torque generating pivot-VCM configuration.

In the present invention, pivot shaft 470 that is attached to the base plate of a HDD carries a pair of coils windings 475 at minimum so that geometrically symmetrical and opposing force components can be generated to produce a torque about the pivot shaft 470. Attached to the bearing sleeve 480 are magnets 485. The magnets 485 move along with the main body of the actuator arm assembly 110.

Figure 5A:
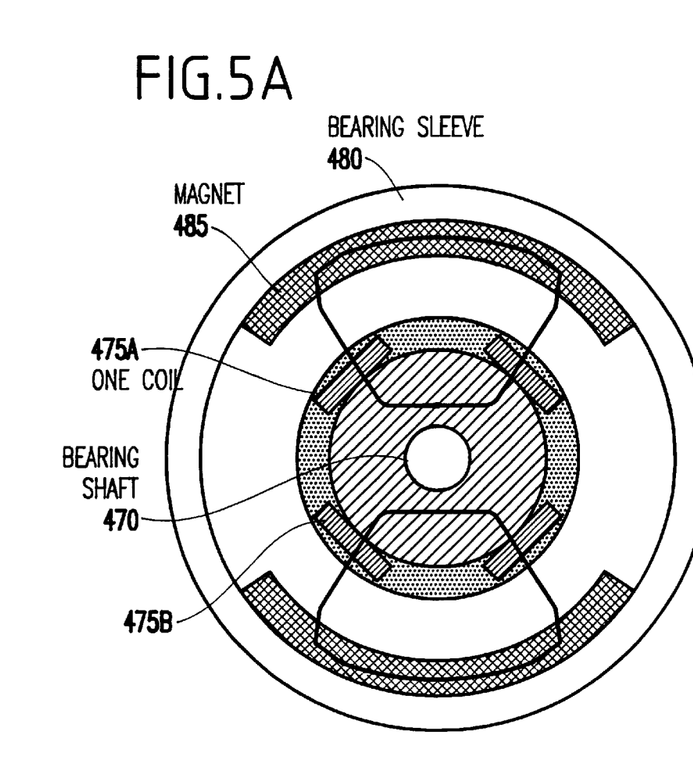
FIG. 5A illustrates a sectional view of a structure of the pivot embedded pivot-VCM according to the present invention with a moving magnetic/moving yoke configuration.
Figure 5B:
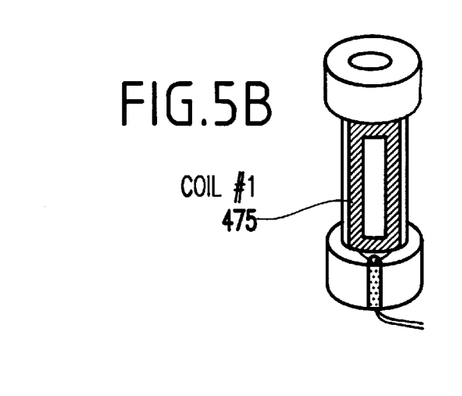
FIG. 5B is a perspective view of the fixed shaft portion of the pivot-VCM and FIG. 5C is a sectional view of the fixed shaft of FIG. 5B.
Figure 5C:
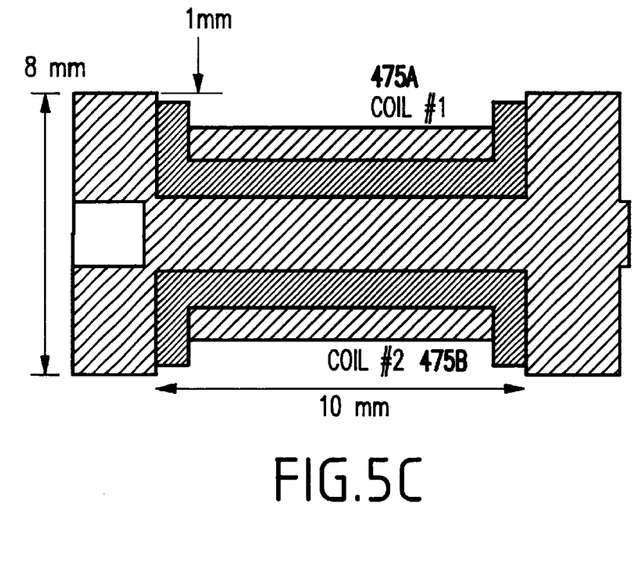

FIGS. 5A–5C show detailed views of a first configuration in which the moving magnet pivot assembly 450 (e.g., with the stationary coil) of FIG. 4 is provided, with FIG. 5A showing a top cross-sectional view of the pivot bearing, FIG. 5B illustrating a shaft 470 with a coil 475A attached thereto, and FIG. 5C illustrating a cross-sectional view of the pivot shaft 470 with first and second coils 475A, 475B. As shown, the coil initially has a rectangular shape which is fitted to the shaft by curling it to embrace the circular/cylindrical geometry of the shaft. The coils may be adhered to the shaft by epoxy or the like. It is noted that, while only two pairs of coils (one on each side) are shown in FIGS. 5A–5C for generating a symmetrical torque, more than two pairs may be provided (e.g., a four-pair system). Preferably, an even number of force generators for generating an equal and opposite force, are provided. As shown in FIG. 5A, the magnetic flux passes through the center shaft 470, through an air gap, through the moving bearing sleeve, back through the air gap, and back into the center shaft.

An advantage of this design is that the electrical links to the coils 475A, 475B, are stationary, and they do not require delicate flexible cabling into a space constrained region of the actuator assembly 110.

A disadvantage is that the magnet carrying bearing sleeve 480 is subject to a radial stress resulting from the magnetic potential field (magnetic flux) in the air gap, and the stress distribution can give rise to a residual torque that can affect the bias force requirement, or can contribute to undesirable actuator dynamics following a seek. Thus, the magnetic flux exerts a radial stress on the bearing sleeve 480, and if there are imperfections in the four magnets, then a radial force may not be perfectly controllable and the radial force may be non-zero. During a large seek, this non-zero radial force could undergo a force "ripple" effect which could excite some undesirable dynamics.

It is noted that, while some exemplary dimensions are provided in FIG. 5C, for example, in FIG. 5C, the invention is in no way limited to or requires such dimensions. Indeed, the invention is scalable to whatever dimensions are desirable and/or being used by the industry over time.

Further, it is noted that the invention could be assembled in any of a number of ways depending upon the manufacturing requirements, constraints, and efficiencies. Indeed, the magnets could be put first affixed (via epoxy or the like) on a relatively thin stainless steel sheet member and that member could be inserted into to the sleeve without the use of specialized processes. Moreover, the coils could be formed of copper wires or the like formed on a thin flexible circuit cable (e.g., 20 turns could be formed on each of five flex circuit cables and a multilayer structure could be formed via soldering the flex circuit cables).

Figures 6A, 6B:
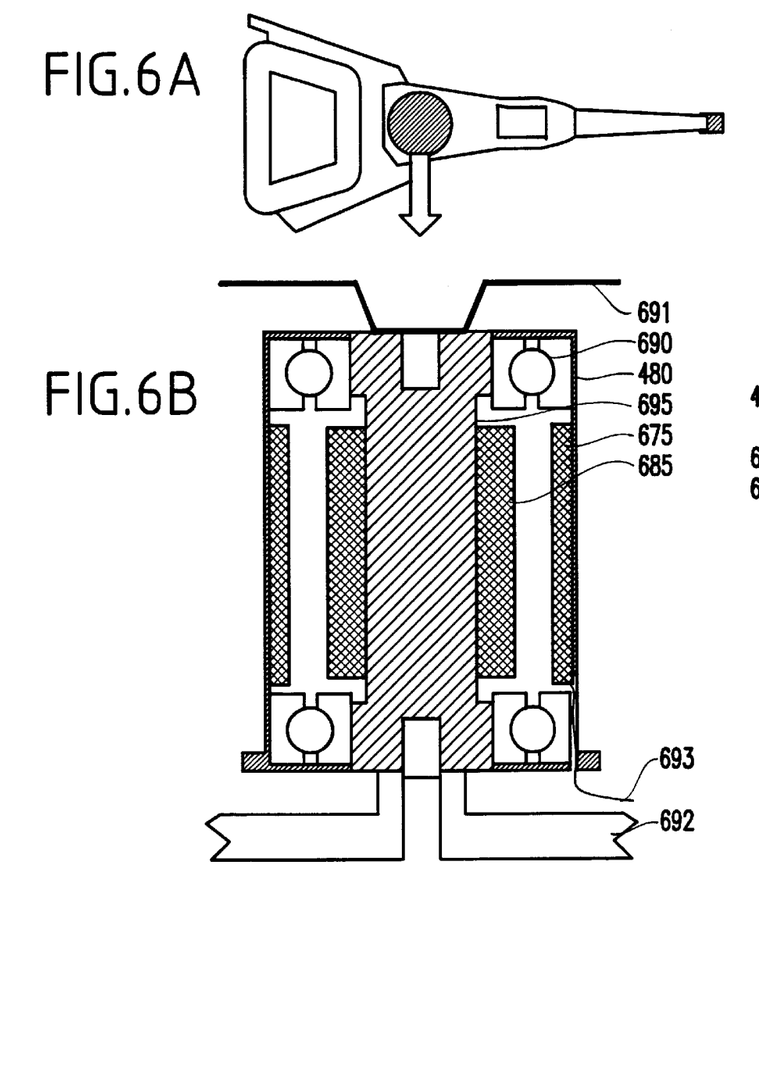
FIG. 6A illustrates a view of a structure of the pivot embedded pivot-VCM with a moving coil/moving yoke configuration according to the present invention.
FIG. 6B is a sectional view of the pivot-VCM along the pivot axis.
Figure 6C:
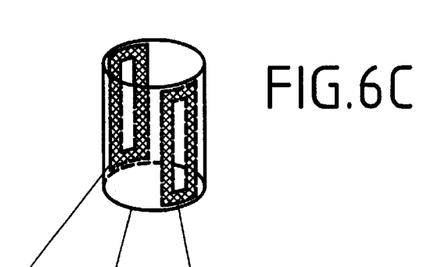
FIG. 6C is a perspective view of the rotatable sleeve portion of the pivot-VCM showing the movable coils and FIG. 6D is a sectional view of the pivot-VCM along an axis perpendicular to the pivot axis.
Figure 6D:
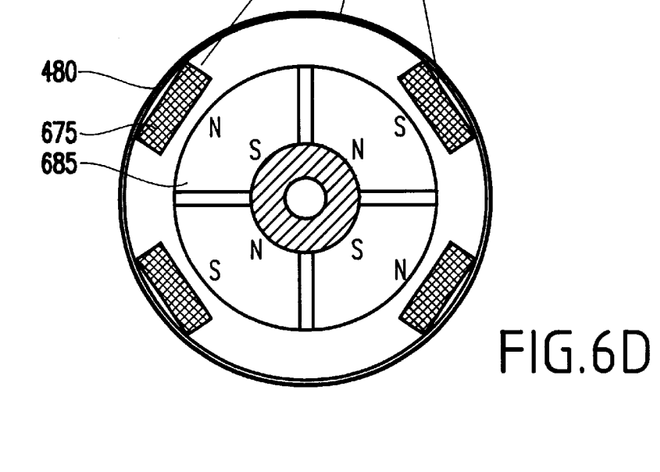

FIGS. 6A–6D show detailed cross-sectional views of an alternative pivot-VCM configuration in which the embedded pivot-VCM includes the flux in the sleeve, with FIG. 6A showing a top view of the pivot in the actuator arm assembly, FIG. 6B illustrates a cross-section of the pivot bearing, FIG. 6C illustrates a detailed view of the magnetic coils on the sleeve, and FIG. 6D illustrating a top view of the pivot bearing.

That is, in this case, the air gap flux is produced by stationary magnets 685 and the current carrying coil windings 675 are attached to the bearing sleeve 480. Also shown in FIG. 6B are ball bearings 690 supporting the moving coil 675 and a bearing shaft 695. A drive cover 691 and a drive base plate 692 are also provided, as well as a coil-wire exit 693.

The disadvantage of this design is that the electrical linkage should be provided by a flexible circuit. The challenge of radial stress remains the same as the bearing sleeve 480 is still required to carry the air gap flux.

That is, the possibility of the ripple effect is still present in this alternative configuration. The inertia due to moving coil is arguably smaller than that of a moving magnet configuration. However, due to proximity to the pivot center, the difference in the incremental inertia of the pivot-VCM pivot may not be substantial.

Further, in the design of FIGS. 6A–6D, since the flux of the magnets must pass through the center shaft, the center shaft preferably is made thinner than in the case of the shaft of FIGS. 5A–5C. Otherwise, the flux may be actuated too soon.

Figure 7A:
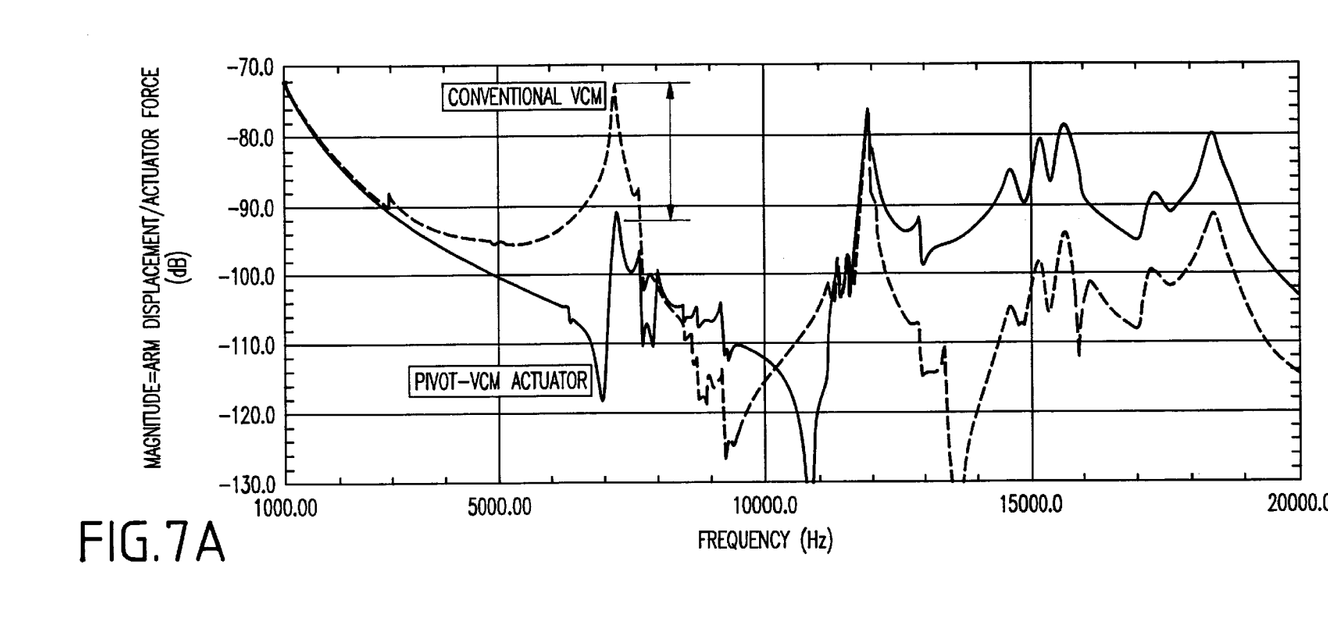
FIG. 7A illustrates the magnitude-frequency response of a computed track-follow transfer function of the pivot-VCM of the invention as compared to the conventional VCM configuration.
Figure 7B:
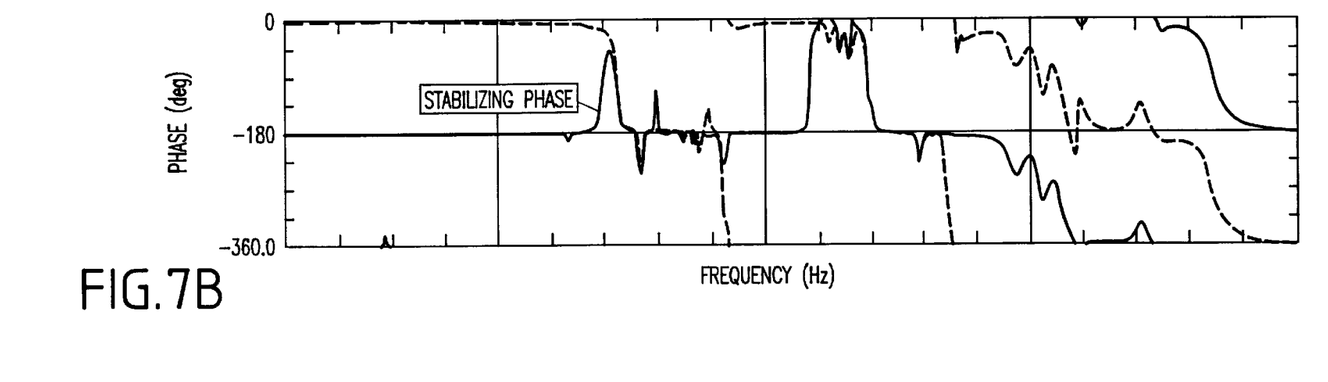
FIG. 7B illustrates the phase-frequency response of a computed track-follow transfer function of the pivot-VCM of the invention as compared to the conventional VCM configuration.

FIGS. 7A–7B show an estimated track-follow dynamics of the pivot-embedded VCM as opposed to the conventional VCM.

It can be observed in FIG. 7A that the gain peaking at 7 kHz is reduced by about 20 dB (e.g., a factor of 10), and, as shown in FIG. 7B, the phase change is no longer a 180-degree lag (as in the conventional VCM) but is only a positive lead (a localized phase change). The first calculated 180-degree phase lag occurs just above 15 kHz.

Thus, as shown, the design approach has merit in enhancing the dynamic performance by an embedded pivot-VCM. Hence, with the invention, the stabilizing phase is reduced significantly with the invention and allows the system to behave even under the effects of resonance (except for minor local variations). That is, the invention cuts down on the resonance participation in the VCM (e.g., the resonance mode in a negative way into the servo system behavior).

FIGS. 8A–8G show an exemplary torque generating capability of a pivot-VCM as extrapolated from a conventional actuator design, and the scalability of the pivot-VCM torque motor. Once again, the dimensions shown are for exemplary purposes only and are in no way for limiting the present invention.

Figures 8A, 8B, 8F, 8G:
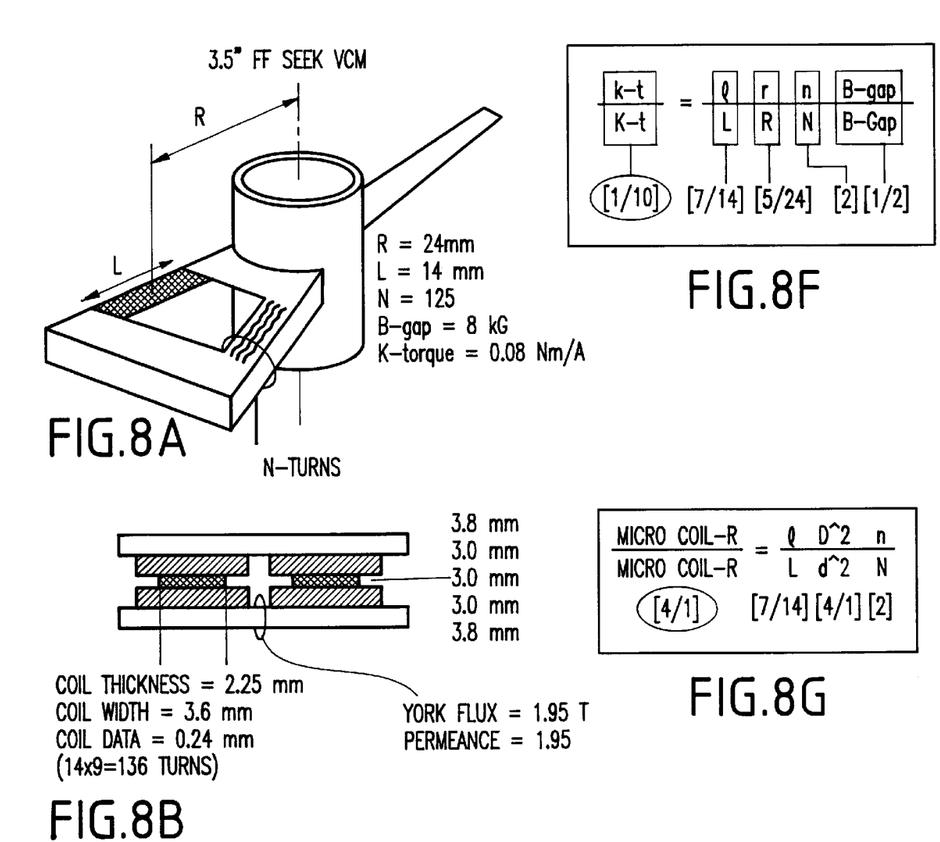
FIG. 8A illustrates a torque generating parameters for seek operation.
FIG. 8B illustrates a cross sectional parameters of the seek magnet/yoke assembly.
FIG. 8F illustrates a torque constant scaling of the pivot-VCM of the present invention.
FIG. 8G illustrates a coil resistance scaling of the pivot-VCM of the present invention.
Figure 8C:
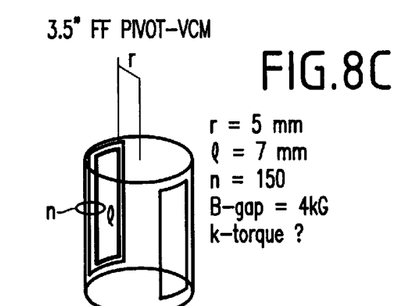
FIG. 8C illustrates a coil geometry for the pivot-VCM of the present invention.
Figure 8D:
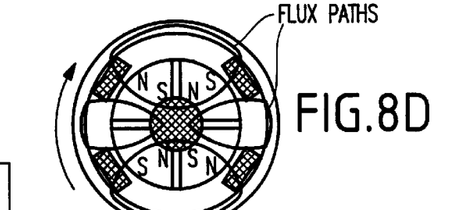
FIG. 8D illustrates a plan view of the coil/magnet/yoke assembly of the pivot-VCM of the present invention.
Figure 8E:
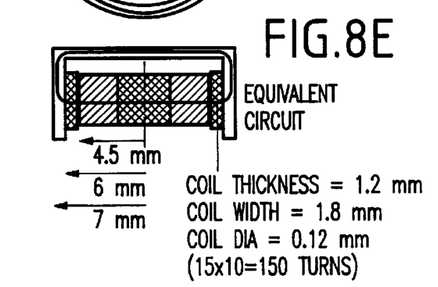
FIG. 8E illustrates an equivalent magnetic circuit of the pivot-VCM of the present invention.

FIG. 8A shows the geometric and electromagnetic parameters, whereas FIG. 8B shows the magnetic circuit parameters of a conventional 3.5" form factor seek VCM. Similarly FIGS. 8C–8E show the parameters of a pivot embedded VCM.

FIGS. 8F and 8G show how the scaling would impact the torque and resistance factors. It can be observed from FIG. 8F that a torque constant k which is 10% of the conventional torque constant can be realistically achieved. On the other hand, the resistance is expected to be about 4 times higher than that of a conventional VCM. Since the current requirements are expected to be about 100 mA RMS, for a 5 to 12 V operation, the increase of resistance by 4 times can be easily managed. Thus, as shown, the invention can be easily scaled to existing conventional designs (and indeed scaled to even smaller designs) to provide the drop-in solution as mentioned above.

Figure 9A:
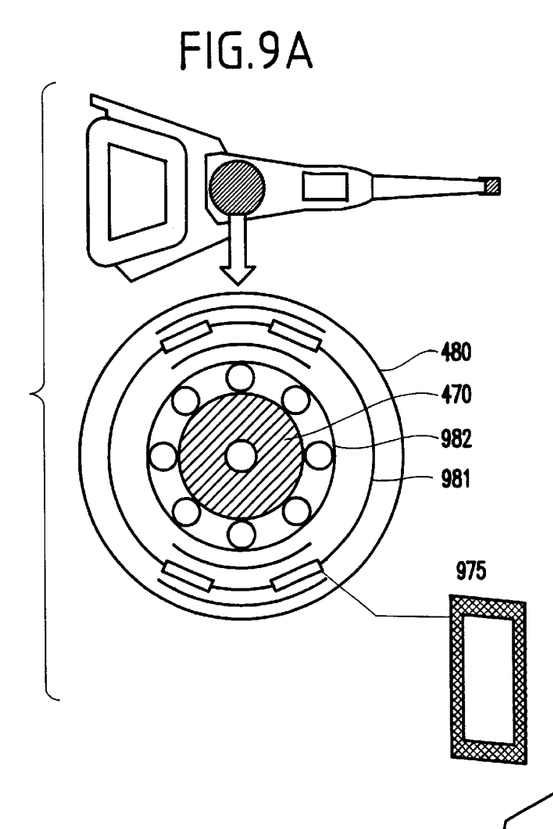
FIG. 9A illustrates a top view of the pivot embedded pivot-VCM with a moving coil/fixed yoke configuration and FIG. 9B illustrates a cross-section of the pivot of FIG. 9A through the pivot axis and shows the bearing shaft and pivot VCM magnet/yoke.
Figure 9B:
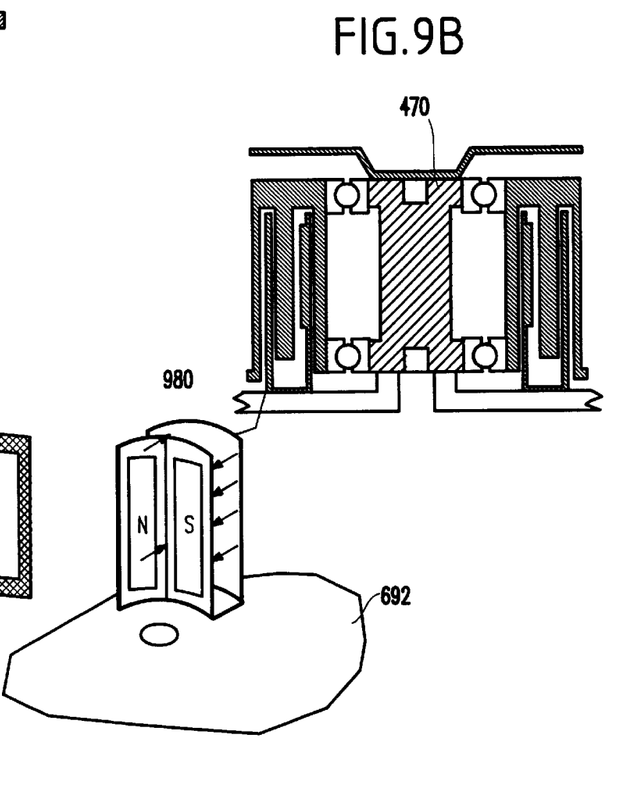

FIGS. 9A–9B show a radially expanded pivot design having a coil 975 arrangement and where the air gap flux is returned not by the bearing sleeve but by a U-cross sectional yoke 980 held by the base plate 692. That is, the base plate area 692 is shown for locating the stationary magnet assembly, and the pivot embedded pivot-VCM is shown with flux in the external yoke 980.

This moving coil design, as shown in FIG. 9A, includes three cylindrical members including the outer bearing sleeve

480 for carrying the main VCM actuator arm, an intermediate cylindrical member 981 for carrying the moving pivot coil 975, and an inner cylindrical member 982 for carrying the shaft/ball bearing arrangement.

This design eliminates radial stress on the bearing sleeve (if it is made of non-ferromagnetic material). Further, this design has more torque generating capability and yet is still integrated with the pivot design. However, a disadvantage of this design is that it requires a larger body housing (e.g., larger diameter) on the actuator since the design positions one more flux carrying member into the gap.

Thus, in the moving coil design of FIGS. 9A–9B, the magnetic flux is carried to the metallic yoke by two flux carrying portions (two stationary yokes) that are inserted into the system design. The coil itself is preferably supported by a non-ferromagnetic material, so it "sees" no magnetic force.

Figure 10:
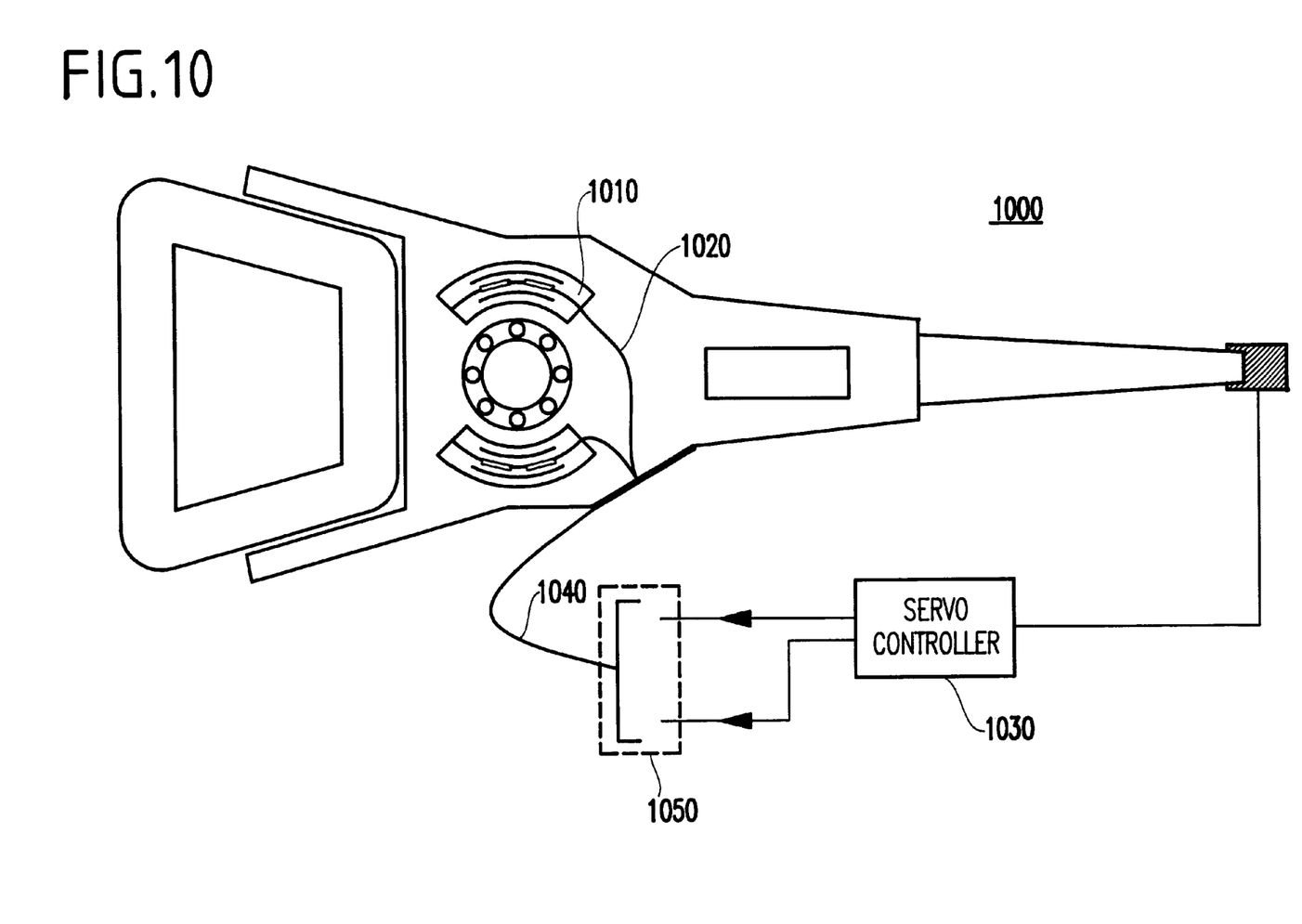
FIG. 10 illustrates an arm embedded moving coil (vertical)/fixed yoke configuration of the pivot-VCM of the present invention.

FIG. 10 shows the design concept 1000 of FIGS. 9A–9B of an embedded pivot-VCM, but applied as an independent design from that of the pivot. Therefore, this design would be useful where the conventional pivot is desired as it is, or where the arm assembly is built by a vendor (OEM) forming the arm initially (e.g., not a retrofit), and two slots already exist on the arm (e.g., one for the pivot and one for the pivot-VCM), thereby allowing the arm to carry the pivot-VCM design. Thus, an advantage of this design is that there is more flexibility in design as there is more space to manipulate the design. Further, pure torque is being generated by the vertical design (e.g., vertically embedded coil). Hence, the full height of the actuator is being used to advantage with this design.

Additionally, with the inventive design, now that the pivot-VCM coil is available during seek, some additional force could be applied by the pivot-VCM to assist the main-VCM during a seek. This would allow the main-VCM to become smaller, if desired by the designer.

However, the modularity of actuator design and pivot design is compromised in this embodiment, and further the arm weight becomes larger, thereby resulting in either the arm moving slower or a higher power being required to move the arm. Further, as the configuration becomes larger, there is a higher likelihood of the resonances falling back down.

Turning now to the details of FIG. 10, a slot 1010 is formed in the actuator arm for the pivot-VCM and magnet yoke assembly also shows the electrical connection (e.g., line 1020) requirement where the feedback from servo controller 1030 from the microprocessor and current drivers is provided through a system flexible cable 1040 that usually carries the read/write information and main VCM current. Further, electrical pins 1050 are shown for connection to the flex cable connector.

FIGS. 11A–11B and 12A–12B show another configuration where the torque producing pivot-VCM pairs are configured in a horizontal plane (i.e., a plane parallel to the disk platters).

Figure 11A:
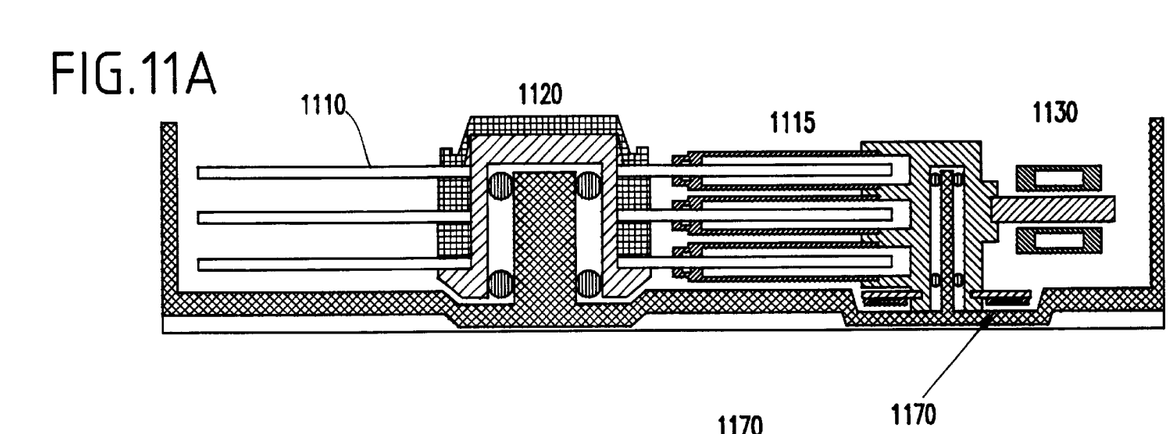
FIG. 11A is a sectional view of a disk drive with the cover removed and showing a horizontal pivot-VCM 1170 located below the rotating disk surface.
Figure 11B:
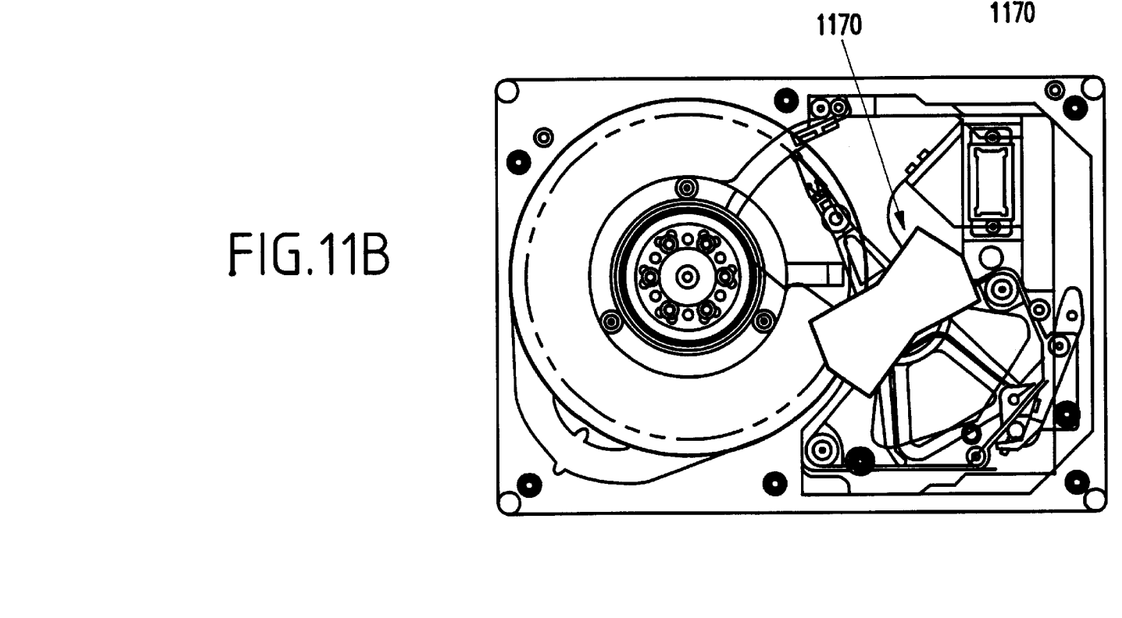
FIG. 11B is a top view of the disk drive of FIG. 11A with the cover removed.

That is, FIGS. 11A–11B show a case where the coils 1170 (e.g., flat, horizontal coils as opposed to vertical coils) are placed below the bottom disk-platter 1110 supported by a motor spindle 1120. Thus, the pivot-VCM is positioned at the bottom of the actuator arm 1115. FIG. 11A is a cross-sectional view of the pivot VCM, whereas FIG. 11B is a top view showing the dual pivot-VCM 1170 on both sides of the actuator 1115. Further shown are the magnets and yoke assemblies 1130.

Figure 12A:
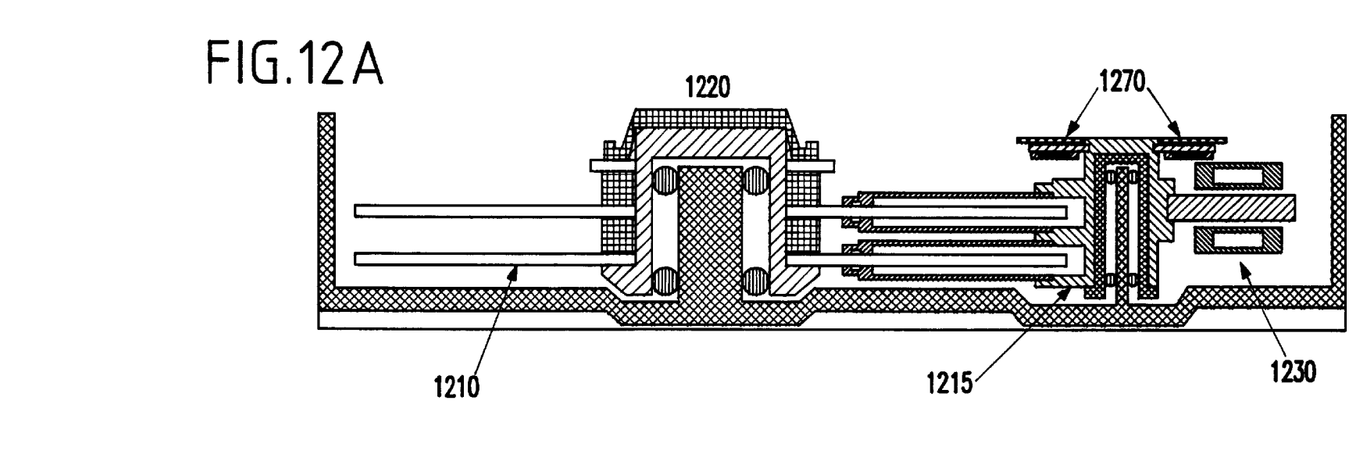
FIG. 12A is a sectional view of a disk drive with the cover removed and showing a horizontal pivot-VCM 1270 located above the rotating disk surface.
Figure 12B:
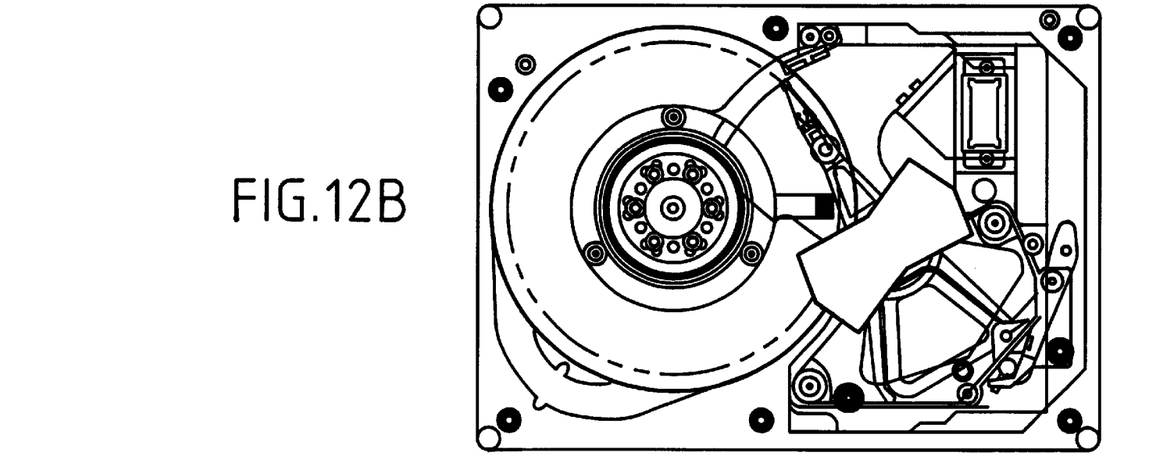
FIG. 12B is a top view of the disk drive of FIG. 12A with the cover removed.

FIGS. 12A–12B show a case where the coils 1270 are placed above the uppermost platter. FIG. 12A is a cross-sectional view of the pivot VCM, whereas FIG. 12B is a top view showing the dual pivot-VCM 1270 on both sides of the actuator arm 1215. It is noted that the top disk 1210 of the disk platters has been removed for clarity. Also shown are the motor spindle 1220 and the yoke/magnet assemblies 1230.

A concern in the design of FIGS. 12A–12B is the magnetic leakage. Further, the mechanical resonance advantage that a pivot integrated bearing could produce is somewhat diminished because of the slender design of the horizontal pivot-VCMs.

It is noted that, notwithstanding the configuration of the designs of FIGS. 11A–12B, the coils can be placed advantageously in positions different from the top or the bottom of the actuator arm. That is, as track densities increase, consumers will not necessarily require or desire as many disk platters on the same spindle.

Thus, it is envisioned that, in disk drives, the number of platters will decrease (e.g., possibly reduced from the current six disk platters down to one or two disks). Hence, with the reduction of the number of disks, there will be greater flexibility in the positioning of the coil and thus, for example the coil could be placed in the center between two disks.

Hence, a pivot VCM could be positioned, for example, in a position intermediate the top and bottom of the actuator arm. Indeed, the coils could be placed in the middle of the actuator arm.

Figure 13A:
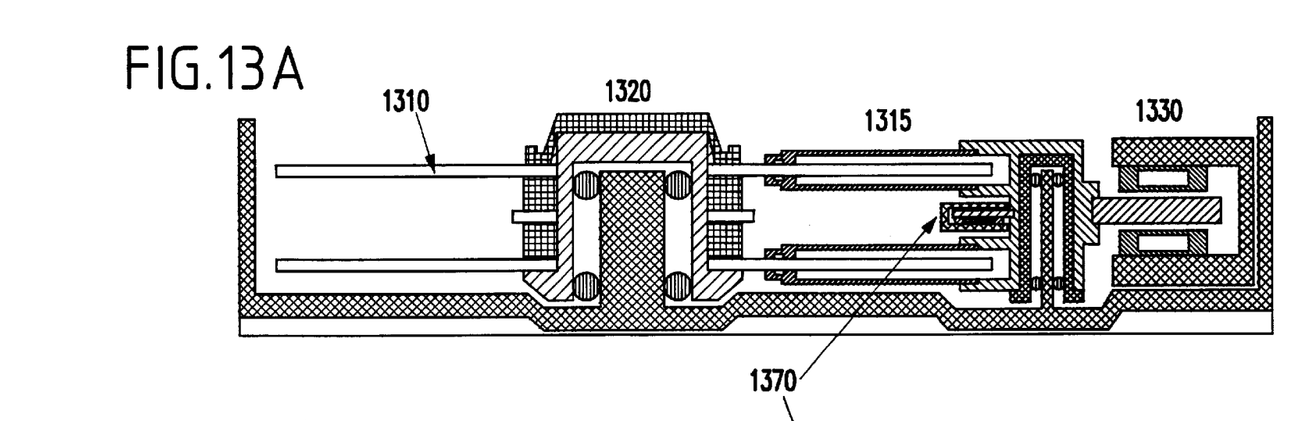
FIG. 13A is a sectional view of a disk drive with the cover removed and showing an alternative positioning of horizontal pivot-VCM 1370 from those shown in FIGS. 11A–12B.
Figure 13B:
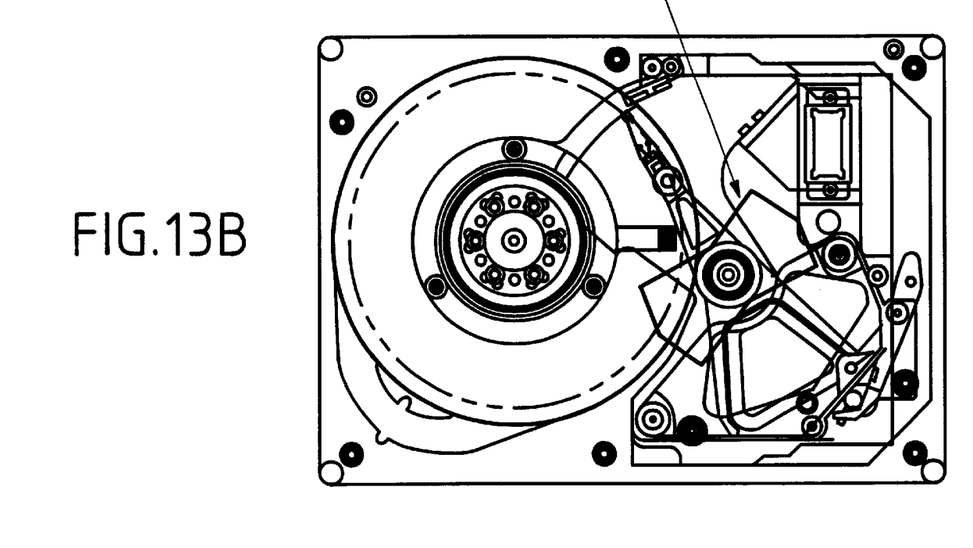
FIG. 13B is a top view of the disk drive of FIG. 13A with the cover removed.

FIGS. 13A–13B show a case where the coils 1370 are placed between the uppermost platter and the lowermost platter. FIG. 13A is a cross-sectional view of the pivot VCM, whereas FIG. 13B is a top view showing the dual pivot-VCM 1370 on both sides of the actuator arm 1315. It is noted that the middle disk 1310 of the disk platters has been removed for clarity and shielding (unreferenced) has been provided. Also shown are the motor spindle 1320 and the yoke/magnet assemblies 1330.

Additionally, it is noted that a plurality of coils need not be provided regardless of the position desired (e.g., top, bottom, or middle). That is, a single coil (moving or stationary) could be used, as shown in FIGS. 13A–13B.

With the unique and unobvious aspects of the invention, an actuator structure (and method) is provided which enhances the track-follow performance without being constrained by the seek actuator design. The invention also provides a method and system for compensating for a relatively low frequency resonance and which, at the same time, optimizes the move/seek time for large displacements, and provides a practical drop-in solution with minimal disruption and redesign of the existing systems.

While the invention has been described in terms of several preferred embodiments, those skilled in the art will recognize that the invention can be practiced with modification within the spirit and scope of the appended claims.

For example, the invention can be employed in computer systems, server system using computer memory systems such as high performance cache systems, and the like. For example, in server systems employing cache memory applications, two drive systems can be used employing the structure of the present invention. Hence, in a server system, instead of providing a plurality of expensive disk drives, low-access data may be placed on a low-cost drive and higher access data may be placed on more costly drive.

What is claimed is:

1. A disk drive rotary actuator assembly, the rotary actuator being pivotable about an axis, the assembly comprising:
   a first voice coil motor (VCM);
   a pivot bearing assembly;

a second voice coil motor (VCM) embedded into the pivot bearing assembly for enhancing dynamic resonance properties of the actuator assembly; and a single position error detecting mechanism commonly provided for the first and second voice coil motors;

wherein said second VCM includes "n" coils for enhancing a torque generating capacity of said second VCM such that a net force is zero and a net torque is cumulative.

2. An actuator assembly as claimed in claim 1 wherein the single position error detecting mechanism provides an input to a servo controller commonly provided for said first and second VCMs.

3. An actuator assembly as claimed in claim 1 wherein the coils are provided in pairs such that each coil of said pair participates in the force generation process.

4. An actuator assembly as claimed in claim 1 wherein said coils are moveable coils and the actuator assembly further comprises a mechanism for moving said moveable coils.

5. An actuator assembly as claimed in claim 1 wherein the coils are stationary coils and the actuator assembly further comprises a plurality of moveable magnets.

6. An actuator assembly as claimed in claim 1 further comprising a main actuator body, the pivot bearing assembly being embedded into the main actuator body.

7. An actuator assembly as claimed in claim 1 wherein the pivot bearing assembly comprises:

a non-rotatable shaft having a central axis generally coincident with the pivot axis of the rotary actuator;

a rotatable sleeve spaced radially outwardly from the shaft; and a bearing within the sleeve and connecting the rotatable sleeve with the non-rotatable shaft for permitting rotation of the sleeve relative to the shaft; and wherein the second VCM is located within the sleeve and comprises an electrically conductive coil and a magnet assembly.

8. An actuator assembly as claimed in claim 7 wherein the magnet assembly of the second VCM is located on the rotatable sleeve.

9. An actuator assembly as claimed in claim 7 wherein the coil of the second VCM is located on the rotatable sleeve.

* * * * *